(12) United States Patent
Chen (10) Patent No.: US 7,730,406 B2
(45) Date of Patent: Jun. 1, 2010

(54) IMAGE PROCESSING SYSTEM AND METHOD

(75) Inventor: Mei Chen, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1406 days.

(21) Appl. No.: 10/969,569

(22) Filed: Oct. 20, 2004

(65) Prior Publication Data

US 2006/0083440 A1  Apr. 20, 2006

(51) Int. Cl.
*G06F 3/00* (2006.01)
*G06K 9/36* (2006.01)
*G06K 9/40* (2006.01)

(52) U.S. Cl. .................... 715/723; 382/284; 382/254

(58) Field of Classification Search ............ 715/723; 382/284, 254
See application file for complete search history.

(56) References Cited

U.S. PATENT DOCUMENTS

| | | | |
|---|---|---|---|
| 5,053,875 A | 10/1991 | Ishii et al. | |
| 5,557,684 A | 9/1996 | Wang et al. | |
| 5,719,594 A | 2/1998 | Potu | |
| 5,973,733 A | 10/1999 | Gove | |
| 6,249,613 B1 | 6/2001 | Crinon et al. ............. 382/236 |
| 6,269,175 B1 | 7/2001 | Hanna et al. | |
| 6,304,682 B1 | 10/2001 | Patti | |
| 6,307,560 B1 | 10/2001 | Kondo et al. | |
| 6,385,245 B1 | 5/2002 | De Haan et al. | |
| 6,393,163 B1* | 5/2002 | Burt et al. ............... 382/294 |
| 6,466,618 B1 | 10/2002 | Messing et al. | |
| 6,476,873 B1 | 11/2002 | Maeng | |
| 6,587,599 B1 | 7/2003 | Huang ..................... 382/284 |
| 6,628,805 B1 | 9/2003 | Hansen et al. | |
| 6,798,834 B1 | 9/2004 | Murakami et al. | |
| 6,983,080 B2 | 1/2006 | Wenstrand et al. | |
| 7,043,058 B2 | 5/2006 | Cornog et al. | |
| 7,088,773 B2 | 8/2006 | Paniconi et al. | |
| 7,119,837 B2 | 10/2006 | Soupliotis | |
| 7,142,600 B1 | 11/2006 | Schonfield et al. | |
| 2001/0048763 A1* | 12/2001 | Takatsuka et al. ......... 382/154 |
| 2002/0118761 A1 | 8/2002 | Lee | |
| 2003/0012457 A1 | 1/2003 | Solecki | |
| 2003/0016884 A1 | 1/2003 | Altunbasak et al. | |
| 2003/0031382 A1 | 2/2003 | Broekaart | |
| 2003/0053692 A1* | 3/2003 | Hong et al. ............... 382/171 |

(Continued)

FOREIGN PATENT DOCUMENTS

EP      1117251      7/2001

(Continued)

OTHER PUBLICATIONS

Irani et al., "Improving Resolution by Image Registration," CVGIP: Graphical Models and Image Processing, vol. 53, No. 3, pp. 231-239 (May 1991).

(Continued)

*Primary Examiner*—Joshua D Campbell
*Assistant Examiner*—Stephen Alvesteffer (57) ABSTRACT

A machine-implemented image processing method includes segmenting a scene into a background scene portion and a foreground scene portion, forming a mosaic for the background scene portion, enhancing the foreground scene portion, and constructing a composite of the background mosaic and the enhanced foreground.

10 Claims, 6 Drawing Sheets

U.S. PATENT DOCUMENTS

| | | |
|---|---|---|
| 2003/0090593 A1 | 5/2003 | Xiong |
| 2003/0108238 A1 | 6/2003 | Xu .............................. 382/173 |
| 2003/0117611 A1 | 6/2003 | Chon et al. |
| 2004/0114799 A1 | 6/2004 | Xu .............................. 382/173 |
| 2004/0151401 A1 | 8/2004 | Sawhney et al. |
| 2006/0188013 A1* | 8/2006 | Coimbra et al. .......... 375/240.2 |

FOREIGN PATENT DOCUMENTS

| | | |
|---|---|---|
| JP | 2000227960 | 8/2000 |
| WO | WO-9844739 | 10/1998 |
| WO | WO99/07156 | 2/1999 |
| WO | WO 00/13407 | 3/2000 |
| WO | WO-0158129 | 8/2001 |
| WO | WO-03043348 | 5/2003 |

OTHER PUBLICATIONS

Adelson et al., "Pyramid Methods in Image Processing," RCA Engineer, 29-6, pp. 33-41 (Nov./Dec. 1984).

H. Tsai et al., "Multiframe Image Restoration and Registration," Advances in Computer Vision and Image Processing, vol. 1, pp. 317-320,1984.

S. Borman et al., "Spatial Resolution Enhancement of Low-Resolution Image Sequences A Comprehensive Review with Directions for Future Research," Laboratory for Image and Signal Analysis, University of Notre Dame, Jul. 1998.

S. Park et al., "Super-Resolution Image Reconstruction: A Technical Overview," IEEE Signal Processing Magazine, pp. 2136, May 2003.

C. Segall et al., "High-Resolution Images from Low-Resolution Compressed Video," IEEE Signal Processing Magazine, pp. 37-48, May 2003.

A.. Tekalp et al., "High-Resolution Image Reconstruction from Lower-Resolution Image Sequences and Space-Varying Image Hestoration," IEEE 1992.

R:. Schultz et al., "Subpixel Motion Estimation for Super-Resolution Image Sequence Enhancement," Journal of Visual Communication and Image Representation, vol. 9 No. 1, Mar. 1998.

P. Eren et al., "Robust, Object-Based High-Resolution Image Reconstruction from Low-Resolution Video," IEEE Transactions on Image Processing; vol. 6 No. 10, Oct. 1997.

Y. Rubnew, "Empirical Evaluation of Dissimilarity Measures for Color and Texture," Computer Vision and Image Understanding, vol. 84, 2001.

M. J. Black and P. Anandan. The robust estimation of mUltiple motions: Parametric and piecewise-smooth flow fields. Computer Vision and Image Understanding, 63(1 ):7.5-104, Jan. 1996.

J. Y. A. Wang and E. H. Adelson. Spatio-Temporal Segmentation of Video Data. Proceedings of SPIEon Image and Video Processing II, vol. 2182, pp. 120-131, San Jose. Feb. 1994.

Zhu ZhiGang, Xu GuangYou, YangYuOong, Jin J S. Camera stabilization based on 2.50 motion estimation and Inertial motion filtering[A]. IEEE. Internaltional Conference on Intelligent Vehicles[C]. Stuttgart, Germany: IEEE, 1998.

Remi Megret, Daniel DeMenthon. A Survey of Spatio-Temporal Grouping Techniques. Research report CS-TR-4403, LAMP, University of Maryland, Aug. 2002.

Qiard G. Medioni, Isaac Cohen, Franc;ois Brenond, Somboon Hongeng, Ramakant Nevatia: Event Detection and Analysis from Video Streams: IEEE Transactions on Pattern Analysis and Machine Intelligence 23(8): 873-889 (2001).

David Tweed and Andrew Calway. Moving Object Graphs and Layer Extraction from Image sequences. In Tim Cootes and Chris Taylor, editors, Proceedings of the British Machine Vision Conference, pp. 133-142. BMVA, Sep. 2001.

J. Y. A. Wang and E H. Adelson. Layered Representation for Motion Analysis. Proceedings of the IEEE Computer Society Conference on Computer Vision and Pattern Recognition 1993. pp. 361-366, New York, Jun. 1993.

J.-R Ohm, P. Ma : "Feature-based cluster segmentation of im~e sequences," Aroceedings IEEE 4th Inte(national Conference on Image Processing (ICIP-97), va .111, pp. 178-181, Oct. 1997.

Kang-Sun Choi, et al., "An Efficient Digital Images Stabilizing Technique for Mobile Video Communications"; IEEE Piscataway. NJ.: Jun. 15, 2000; pp. 246-247; XP002326257.

Hansen, M., et al.: "Rel-Time scene stabilization and Mosaic Construction"; Image Understanding Workshop; NDv. 1994; pp. 457-465; XPOOO852887.

Bernd Heisele, "Motion-Based Object Detection and Tracking in Color Image Sequences," Proceedings IEEE 4th International Conference on Image Processing (ICIP-97), voLIII, Oct. 1997.

* cited by examiner

IMAGE FRAME i

FIG. 8A

IMAGE FRAME i+1

IMAGE PROCESSING SYSTEM AND METHOD

BACKGROUND

Mosaic images are used daily throughout the world. One common use of a mosaic image is a weather map. Several frames from different satellite positions are generally used to form a mosaic for the weather maps viewed during weather forecasts. There are many other uses for mosaic images in industry, and government. There are also many other uses of mosaic images by consumers.

Mosaic images are generally formed from a series of overlapping images that cover a scene. The overlapping images are aligned and merged to produce a picture that allows a viewer to visualize an entire scene with a much larger field of view. More specifically, creating a mosaic image includes registering a set of images to compute alignment parameters into a single image. In some instances this includes stitching several scenes or frames together. In other instances, a large number of scenes or frames must be stitched together, such as forming a wide-angle horizontal strip through 360 degrees and then matching the two ends to form a continuous circle. In other instances a number of two dimensional scenes or frames are stitched together to form a full-circle spherical view of an environment. Once the frames are stitched together, various artifacts are removed or compensated for. For example, blending between the frames removes seams between the scenes or frames. The individual images can also be pre-processed to remove artifacts from the lens used to produce the scenes or frames.

Mosaic images can be used to produce a still output or a video output.

DETAILED DESCRIPTION

A system and method for capturing and processing images are described herein. In the following description, numerous specific details are set forth. The following description and the drawing figures illustrate aspects and embodiments of the invention sufficiently to enable those skilled in the art. Other embodiments may incorporate structural, logical, electrical, process, and other changes; e.g., functions described as software may be performed in hardware and vice versa. Examples merely typify possible variations, and are not limiting. Individual components and functions are optional, and the sequence of operations may vary or run in parallel. Portions and features of some embodiments may be included in, substituted for, and/or added to those of others. The scope of the presently described subject matter encompasses the full ambit of the claims and all available equivalents.

This description of the embodiments is divided into four sections. In the first section, a system-level overview is presented. In the second section, methods for using example embodiments are described. In the third section, an example implementation is described. In the fourth section, a hardware and operating environment is described.

System-Level Overview

This section provides a system level overview of example embodiments of the invention.

Figure 1:
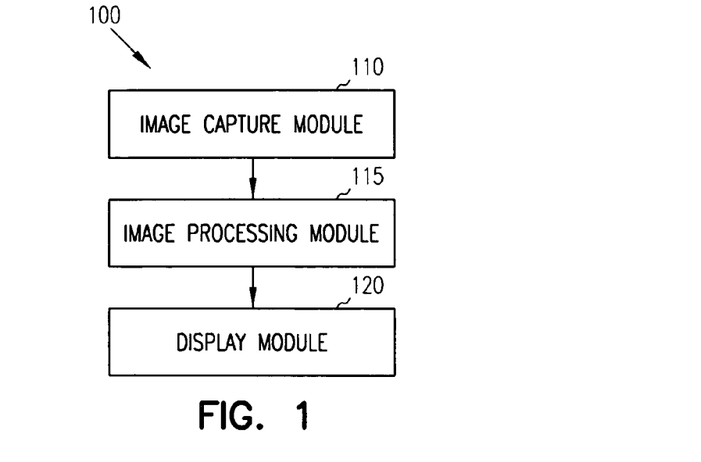
FIG. 1 is a diagram illustrating an overall structure of an image system, according to an example embodiment.

FIG. 1 is a schematic diagram illustrating an imaging system 100, according to an example embodiment. The imaging system 100 includes an image capture module 110, an image processing module 310 and a display unit 120. The image capture module 110 is any hardware or software system or subsystem capable of capturing a sequence of images associated with a scene. The image capture module can also be implemented as a combination of software and hardware. Examples of the image capture module 110 can be a camera, a scanner, or even a storage device, such as a hard disk drive. Each of these devices is capable of storing a series of images associated with a scene. Communicatively coupled to the image capture module 110 is an image processing module 115. The image processing module 115 receives a plurality of images from the image capture module 110 and processes the images. Communicatively coupled to the image processor is a display 120. Examples of the image display 120 can be a computer screen, a printer, or even a projector. After processing the images, an output from the image processing module 115 is placed on at least one display 120.

Figure 2:
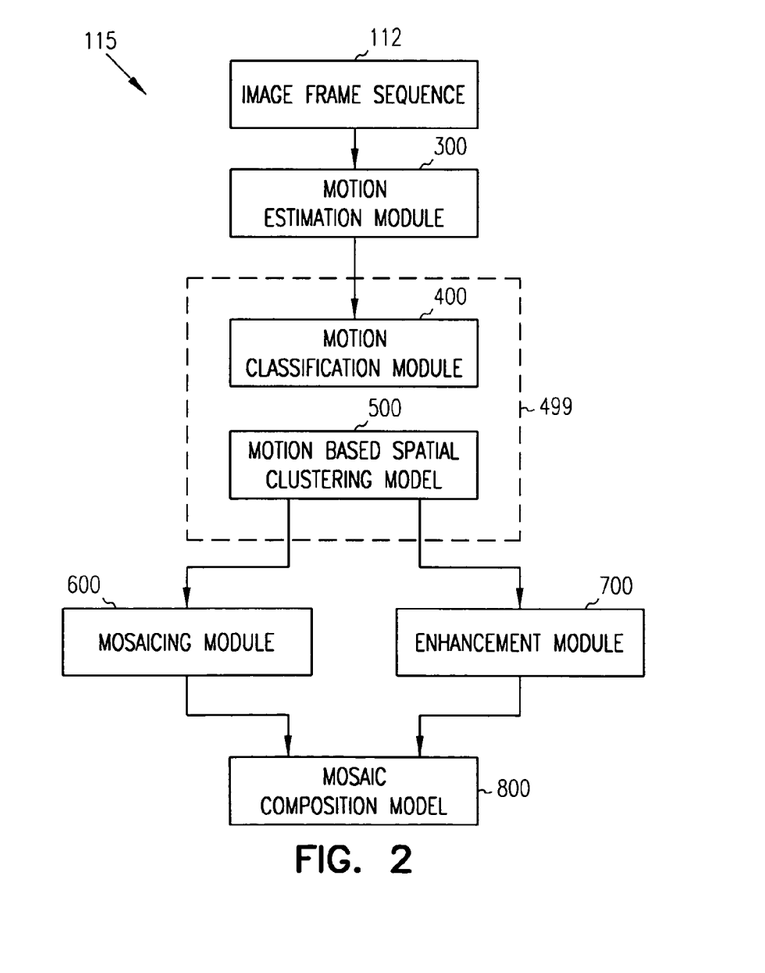
FIG. 2 is a flow diagram illustrating an imaging method, according to an example embodiment.

FIG. 2 is a schematic diagram further illustrating the imaging processing module 115, according to an example embodiment. The image processing module has a base image sequence 112 as an input to the image processing module 115. The base image sequence includes a set or subset of images captured by the image capture module 110 (see FIG. 1). The image sequence 112 can correspond to an original image frame sequence captured by an image sensor or a processed version of such an original image frame sequence. For example, the image sequence 112 can include a sampling of the image frames of an original image frame sequence captured by an image sensor or a compressed or reduced-resolution version of an original image frame sequence captured by an image sensor or image capture device. The image processing module 115 includes a motion estimation module 300, a motion classification module 400, and a motion based spatial clustering module 500. The motion classification module 400 and the motion based spatial clustering module 500 can also be termed as a scene segmentation module 499. The image processing module 115 also includes a mosaicing module 600 and an image enhancement module 700 and a mosaic composition module 800. Each of the modules listed above can be implemented using any hardware or software system or subsystem capable of motion estimation, scene segmentation, motion classification, motion based spatial clustering, image enhancement, mosaicing, and mosaic composition. In addition each of the modules listed above can be implemented on a system or subsystem employing a combination of hardware and software. In general, the modules of the imaging system are not limited to any particular hardware or software configuration, but rather can be implemented in any computing or processing environment, including in digital electronic circuitry or in computer hardware, firmware, device driver, or software. For example, in some implementations, these modules can be embedded in the hardware of any one of a wide variety of electronic devices, including digital image sensors, printers, and portable electronic devices, such as mobile phones and personal digital assistants (PDA) or the like.

Figure 3:
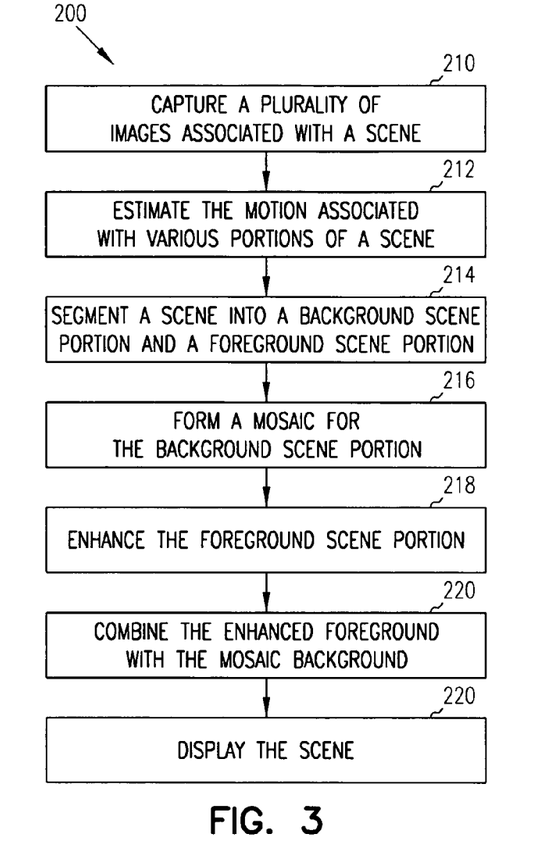
FIG. 3 is a flow diagram illustrating a method for processing images, according to an example embodiment.

FIG. 3 is a flow diagram illustrating an image processing method 200, according to an example embodiment. As shown in FIGS. 1 and 2, a sequence of images is captured at block 210. At least a portion of the captured images are processed. Image processing includes estimating the motion associated with various portions of a scene or image at block 212, and segmenting the scene or image into a background scene portion and a foreground scene portion at block 214. Segmenting the scene or image into a background scene portion and a foreground scene portion is accomplished by using the methods further detailed below in the motion classification module 400 and the motion based spatial clustering module 500 (see FIG. 2). A mosaic is formed for the background scene portion at block 216 and the foreground scene portion of the scene or image is enhanced at block 218. The enhanced foreground portion and the mosaic background are combined at block 220 and displayed at block 222.

Methods of the Invention

This section describes methods performed by embodiments of the invention. In certain embodiments, the methods are performed by machine-readable media (e.g., software), while in other embodiments, the methods are performed by hardware or other logic (e.g., digital logic). In this section, FIGS. 4-9 will be discussed.

The motion estimation module 300 computes respective sets of motion vectors for pairs of successive image frames in sequence 112. The motion vectors estimate the apparent motion of features or objects appearing in the image frames. In general, motion estimation module 300 may compute motion vectors based on any standard model for estimating the motion image objects. For example, motion vectors may be computed based on an affine motion model that describes motions that may appear in image sequences, including translation, rotation, zoom, and shear. Affine motion is parameterized by six parameters as follows:

$$V_x(x,y) = a_{x0} + a_{x1}x + a_{x2}y \quad (1)$$

$$V_y(x,y) = a_{y0} + a_{y1}x + a_{y2}y \quad (2)$$

wherein $V_x(x,y)$ and $V_y(x,y)$ are the x and y components of a velocity motion vector at point (x,y), respectively, and the $a_k$'s are the affine motion parameters.

Figure 4A:
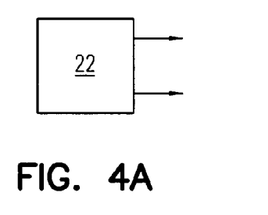
FIG. 4A is a diagrammatic view of a type of respective motion associated with a dynamic image sequence according to an example embodiment.
Figure 4B:
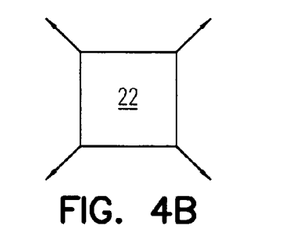
FIG. 4B is a diagrammatic view of a type of another respective motion associated with a dynamic image sequence according to an example embodiment.
Figure 4C:
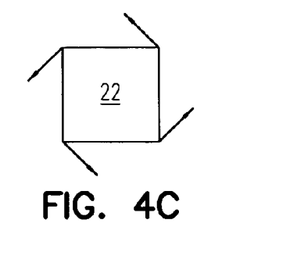
FIG. 4C is a diagrammatic view of a type of still respective motion associated with a dynamic image sequence according to an example embodiment.
Figure 4D:
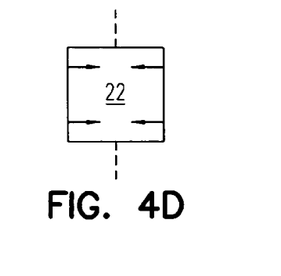
FIG. 4D is a diagrammatic view of a type of respective motion associated with a dynamic image according to an example embodiment.

The four basic motions described by an affine motion model are illustrated in FIGS. 4A-4D. FIG. 4A shows parallel motion vectors that represent a translation of an object 22 at a constant distance from an image sensor. FIG. 4B shows vectors having a common focus of expansion that represent translation of object 26 in depth relative to an image sensor, or zooming (uniform scaling) motion. FIG. 4C shows concentric motion vectors that represent rotation of object 22 at a constant distance from a view axis. FIG. 4D shows vectors starting from straight line segments that represent rotation of a planar object 22 perpendicular to the view axis.

In some embodiments, motion estimation module 300 estimates movements of individual pixels or groups of pixels from a given image frame to a neighboring image frame bases on an optical flow model (or dense motion model of the base image). The motion estimates may be computed for one or both of forward and backwards transitions in time (i.e., from an earlier-captured image frame to a later-captured image frame, or from a later-captured image frame to an earlier-capture image (frame)). As used herein, the term "neighboring image frames" refers to adjacent image frames in an image frame sequence without regard to the temporal ordering of the neighboring image frames in terms of capture time. In addition, the term "successive image frames" refers to adjacent image frames in an image frame sequence that may be ordered chronologically or reverse-chronologically in terms of capture time.

In an optical flow model, the movements are represented by velocity vectors (dx/dt, dy/dt) that describe how quickly a pixel (or a group of pixels) is moving across an image, and the direction of pixel movement. The optical flow model represents a projection of three-dimensional object motion onto the image sensor image plane. Any one of a wide variety of standard optical flow computation methods may be used by the motion estimation model 300 to compute motion vectors. In some implementations, a multi-scale coarse-to-fine algorithm based on a gradient approach may be used to compute the optical flow motion vectors.

Motion classification module 400 classifies the motion vectors computed by the motion estimation module 300 into motion classes, which represent different respective motions of different objects appearing in the image frame sequence, including independently moving objects or foreground objects, and the stationary or background object. In some embodiments, motion classification module 400 quantizes the computed motion vectors based on a measure of distance (d(V,V')) between motion vectors (V and V'). In some implementations, the distance corresponds to the L2 (or Euclidean) norm, which is computed as follows for the case where V and V' are motion vectors defined with respect to the affine motion model of equations (1) and (2) above with parameters $a_k$ and $a'_k$, respectively:

$$d(V, V') = \sqrt{\sum_{m=x,y} \sum_{i=0}^{2} (a_{mi} - a'_{mi})^2} \quad (3)$$

Motion classification module 400 may classify motion vectors in each image frame into a respective set of motion classes using any type of vector classification method. For example, in some implementations, motion vectors in each image frame are classified in accordance with a standard k-means vector clustering method. In these implementations, a set of clusters representing an initial partition between motion vectors in a given image frame may be determined based on an empirically determined threshold distance. The partition is refined iteratively by assigning pixels to each partition and re-computing the center of each cluster. In some implementations, the final partition corresponds to a respective set of motion clusters for each image frame in which the total distance between pixels (or pixel groups) and the centers of their respective clusters is minimized, while the distance between different motion clusters is maximized.

Figure 5:
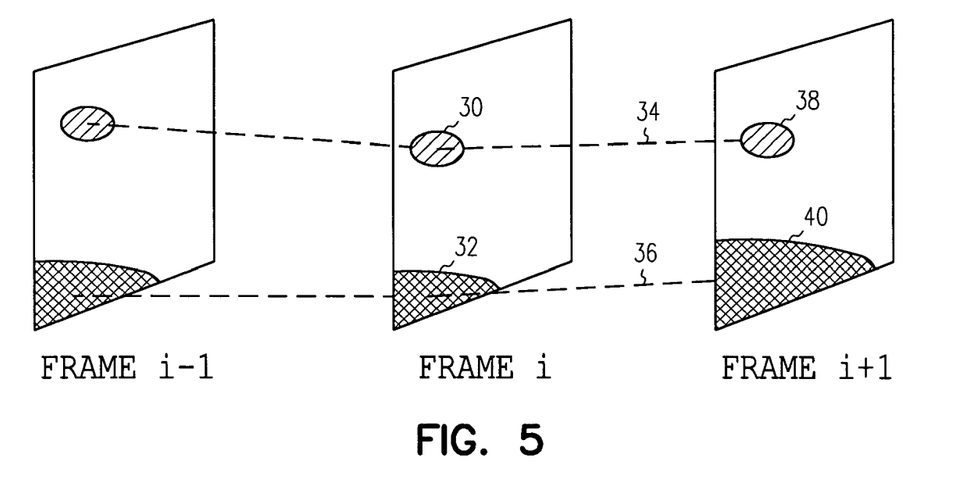
FIG. 5 is a diagrammatic view illustrating a mapping between motion clusters corresponding to objects appearing in series of three successive image frames of an image frame sequence associated with portions of a scene, according to an example embodiment.
Figure 6:
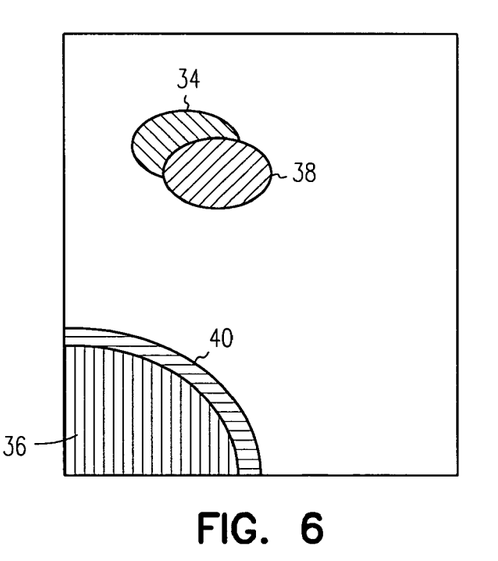
FIG. 6 is a diagrammatic view of objects appearing in a pair of successive image frames in the image frame sequence of FIG. 5 superimposed in a common image frame associated with portions of a scene, according to an example embodiment.

Referring to FIGS. 5 and 6, motion-based spatial clustering module 500 identifies objects (or components) in the image frames based at least in part on the sets of motion clusters generated by motion classification module 16. In some embodiments, a parametric motion model (e.g., an affine motion model) is computed for each motion cluster 30, 32 in a given image frame. In some implementations, the affine model is estimated by using least squared error (LSE) regression. Next, each motion cluster 30, 32 is projected into at least one neighboring image frame (e.g., image frame i+1) based on the computed parametric motion models. A measure of spatiotemporal consistency is computed between the projected clusters 34, 36 and the original clusters 38, 40 in the neighboring image frame. As used herein, "spatiotemporal consistency" refers to the persistence of an object cluster across multiple image frames of an image frame sequence. In some implementations, the spatiotemporal consistency of a given cluster (e.g., cluster 34) in a given image frame (e.g., image frame i) is measured by the degree of overlap between the projection of the given cluster (e.g., projected cluster 34) and an original cluster (e.g., cluster 38) of the neighboring image frame (e.g., image frame i+1). The spatiotemporal consistency between the original clusters and the projected clusters can be expressed mathematically as follows:

$$spatiotemporal consistency = \frac{\left\{\sum_{i,j} (i, j) \subset cluster_{projected}\right\} \cap \left\{\sum_{i,j} (i, j) \subset cluster_{original}\right\}}{\left\{\sum_{i,j} (i, j) \subset cluster_{projected}\right\}}$$

In the example illustrated in FIG. 6, the degree of overlap between projected cluster 34 and original cluster 38 is approximately 33%, whereas the degree of overlap between projected cluster 36 and original cluster 40 is 100%. In some other implementations, the spatiotemporal consistency of a given cluster (e.g., cluster 34) in a given image frame (e.g., image frame i) is measured by the distance between the centroid of the projection of the given cluster (e.g., projected cluster 34) and the centroid of an original cluster (e.g., cluster 38) of the neighboring image frame (e.g., image frame i+1).

$$spatiotemporal consistency = \|centroid_{projected} - centroid_{original}\|$$

The spatiotemporal consistency of each motion cluster in a given image frame may be computed across more than one neighboring image frames in one or both of a chronological direction and a reverse-chronological direction.

Figure 7:
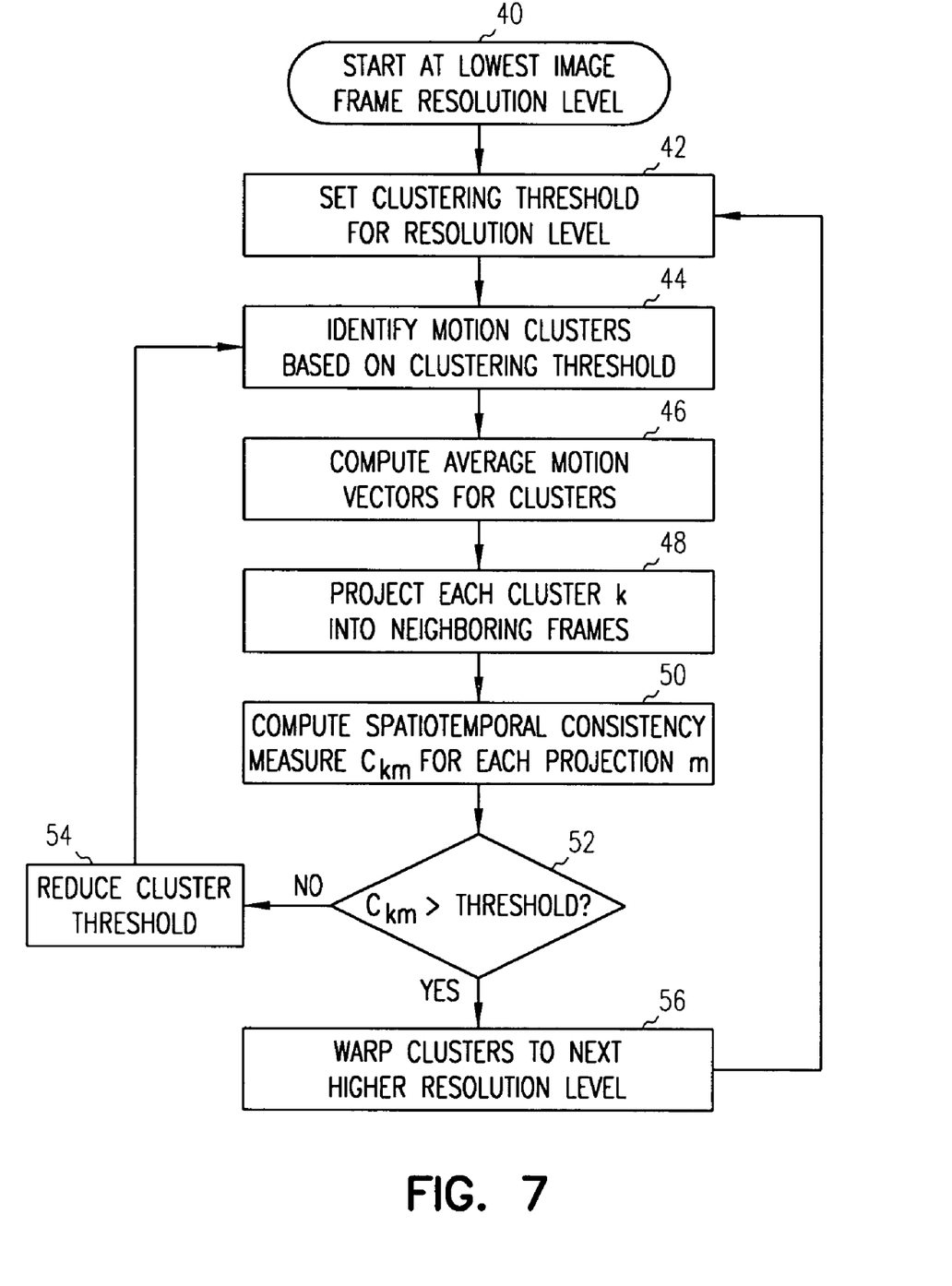
FIG. 7 is a flow diagram illustrating a method for classifying motion vectors into motion classes, according to an example embodiment.
Figure 8A:
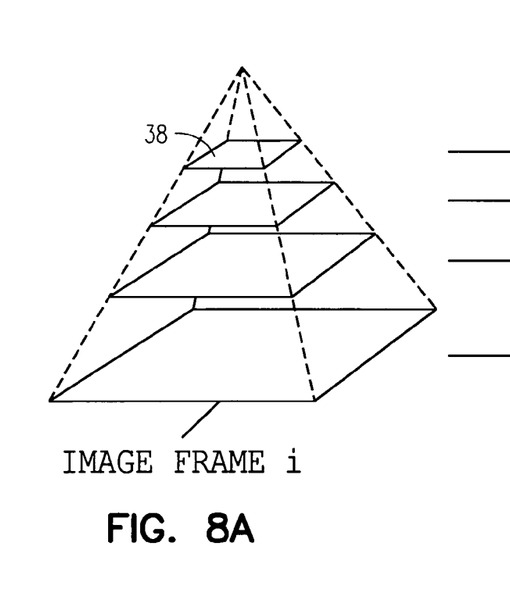
FIG. 8A is a diagrammatic view of a projection from a multiresolution representation of an image from to a corresponding multiresolution representation of a neighboring image, according to an example embodiment.
Figure 8B:
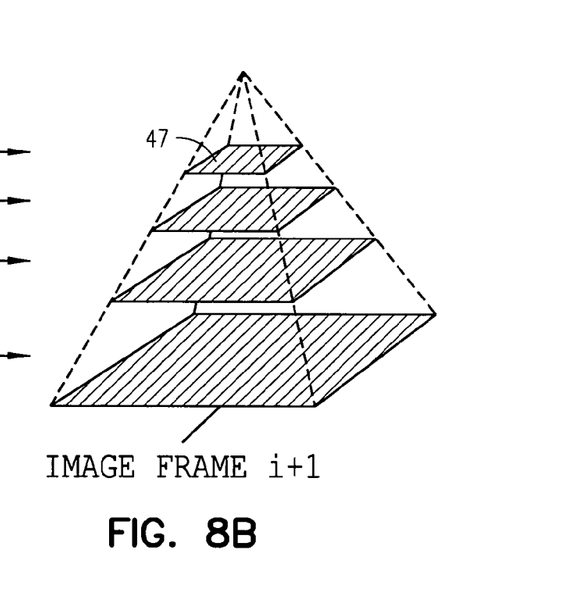
FIG. 8B is another diagrammatic view of a projection from a multiresolution representation of an image to a corresponding multiresolution representation of a neighboring image, according to an example embodiment.

Referring to FIGS. 7, 8A and 8B, in some embodiments, the motion-based spatial clustering module 500 and the motion classification module 700 iteratively refine the motion clusters in the image frames in a hierarchical way from a coarse image frame resolution to a high image frame resolution. A given image frame (shown in FIG. 8A) is down-sampled to produce an image frame 38 at a predetermined lowest resolution level at block 40 of FIG. 7. An initial, empirically determined clustering threshold is set based on the current image frame resolution level at block 42. Motion clusters are identified based on the clustering threshold at block step 44. In some implementations, the motion clusters may be identified in accordance with the k-means clustering approach described above. Average or parametric motion vectors are computed for each of the identified motion clusters at block 46. Each cluster k in the given image frame 38 is projected into one or more neighboring image frames 47, which have been down-sampled to the current image frame resolution level at block 48. A spatiotemporal consistency measure $C_{km}$ is computed for each projection m of cluster k at block 50. If a spatiotemporal consistency measure $C_{km}$ is less than an empirically determined threshold at block 52, the clustering threshold is reduced at block 54 and the motion clustering process is repeated (starting at block 44) at the current image frame resolution level until the consistency measures $C_{km}$ are greater than or equal to the empirically determined threshold at blocks 44-52. After a set of motion clusters that have consistency measures $C_{km}$ greater than or equal to the empirically determined threshold is generated at block 52, the motion clusters are warped to the next higher resolution level at block 56 and the process is repeated to refine the clustering at blocks 42-56.

In some implementations of the method shown in FIG. 7, the warped (or up-sampled) motion clusters are adjusted when a spatiotemporal consistency measure $C_{km}$ is less than the empirically determined threshold for the current image frame resolution at block 52. In this way, the speed of the motion-based spatial clustering process may be increased without substantially compromising the accuracy of the final clustering results.

Information about the motion clusters associated with a scene or sequence of images is then used to segment a scene into at least one background portion or patch, and into at least one foreground portion or patch (block 214 of FIG. 3). A motion vector is associated with the motion cluster. In other words, many of the pixels associated with a particular motion cluster move at about the same magnitude and direction. The magnitude of the motion vector associated with a motion cluster is determined. Generally, a lower magnitude motion vector will be associated with a background portion or patch. A higher magnitude motion vector will generally be associated with a foreground portion or patch. In some embodiments of the invention, there can be more than one background portion or patch. In other embodiments of the invention, there can also be more than one foreground portion or patch. A threshold value is selected for the magnitude of the motion vector. Every motion cluster having a value above or equal to the threshold is categorized as a foreground portion or patch while every motion cluster having a value below the threshold is categorized as a background portion or patch.

The background scene portion or portions, from the individual images of an image sequence associated with a scene, are then stitched together to form a mosaic of substantially all the entire background portions shown in the sequence of images at block 216. In other words, a mosaic representation is constructed from all frames in a scene sequence, yielding a panoramic view of the scene. Three steps are involved in the process: the alignment of the images of the sequence, the integration of the images into a mosaic image, and the computation of significant residuals between the mosaic and individual frames.

Image alignment depends on the chosen world model and motion model. The alignment can be limited to 2D parametric motion models, or can utilize more complex 3D motion models and layered representations as shown in 8A and 8B. In this section, the 2D alignment methods are described in some detail, and some 3D alignment methods are basically detailed. This section also describes how to compose frame-to-frame alignment parameters to achieve the alignment of an entire sequence of images.

The parametric motion that is used to register (align) images represents the motion of a dominant surface in the scene, in this particular application, the background scene. In the current implementation, 2D parametric motion models (a 6-parameter affine transformation and an 8-parameter quadratic transformation) are used to approximate the motions between two images.

To align two images (an "inspection"0 image and a "reference" image), a hierarchical direct registration technique with a planar surface image motion model is used. This technique first constructs a Laplacian pyramid from each of the two input images, and then estimates the motion parameters in a coarse-fine manner. Within each level the sum of squared difference (SSD) measure integrated over regions of interest (which is initially the entire image region) is used as a match measure. This measure is minimized with respect to the quadratic image motion parameters.

The SSD error measure for estimating the image motion within a region is:

$$E(\{u\}) = \sum_x (I(x, t) - I(x - u(x), t - 1))^2 \quad (4)$$

where x=(x,y) denotes the spatial image position of a point, I the (Laplacian pyramid) a function of the image intensity, and u(x)=(u(x,y), v(xy)) denotes the image velocity at that point. The sum is computed over all the points within the region and [u] is used to denote the entire motion field within that region.

A 2D motion field of a 3D planar surface can be described by the 2D quadratic transformation:

$$u(x) = p_1 x + p_2 y + p_5 + p_7 x^2 + p_8 xy$$

$$u(x) = p_3 x + p_4 y + p_6 + p_7 xy + p_8 xy^2 \quad (5)$$

The objective function E given in Equation (4) is minimized via the Gauss-Newton optimization technique. Let $p_i$ denote the current estimate of the quadratic parameters. After warping the inspection image (towards the reference image) by applying the parametric transformation $p_i$ to it an incremental estimate δp can be determined. After iterating a certain number of times within a pyramid level, the process continues at the next finer level.

With the above technique, the reference and inspection images are registered so that the image region is aligned. The above estimation technique is a least-squares based approach and hence possibly sensitive to outliers. However, this sensitivity is minimized by doing the least-squares estimation over a pyramid. The pyramid based approach locks on to the dominant image motion in the scene.

The computation of 3D alignment may involve the estimation of the residual parallax motion with respect to the reference plane aligned by a 2D mosaic. The computation of the parallax information can proceed in one of two ways. The first technique takes a sequential registration approach, in which the plane is first registered using a 8 parameter quadratic transformation. The residual parallax is then estimated. The second technique simultaneously estimates the planar and parallax motion components, and is hence referred to as a simultaneous registration.

In the sequential approach, the plane registration is achieved in the same manner as described above. After the plane is aligned, the parallax vectors and the direction of translation are simultaneously estimated using the quasi-parametric technique. The quasi parametric technique is generally more accurate than using optic flow, but first an initial estimate for translation is made. An initial estimate of the translation direction may be obtained by using the optical flow.

The sequential registration algorithm is useful when there is a visible planar surface in the scene that occupies a significant portion of the image. However, in many situations, such as images of curved objects and hilly terrains, no such plane may be present in the scene. Hence, the sequential registration algorithm may fail in the first step (of plane alignment). However, the plane+parallax representation is still applicable, since a "virtual" reference plane can be used as the basis for computing the residual parallax. To handle the "virtual" plane situation, the planar surface alignment and the estimation have to be performed simultaneously. This algorithm includes at least two steps:

1. First, the plane registration algorithm described above is applied to the entire scene. Although this may not register any real or virtual plane, it provides a good set of initial parameters for the second step.

2. The total motion vector at a point is expressed as a sum of the motion vector due to a planar surface and the residual parallax motion. The initial estimate for the planar motion field is given by the results of the first step given above. The parallax field is initialized to zero, and the translational motion parameters are set to an arbitrary initial value. Both these components are then refined simultaneously, i.e., the 8 parameters of the quadratic transformation are refined, as well as the translational motion parameters and the parallax magnitude at each pixel.

A refinement process achieves alignment of every pixel within the region of overlap between the two views. The mosaic image that is obtained by achieving 3D alignment between multiple views is known as the "3D corrected mosaic". The recovery of parallax information uses at least two views of the same portion of the scene. This means that the extension of a single view into a mosaic consisting of information from a second view uses a third view to provide the parallax information for the second view (in particular, for those portions of the second view not visible in the first view). The three views should partially (but not completely) overlap with each other. Given such views, the process of construction involves the following steps: The first step is to register the first two images and to build a parallax map in the second frame's coordinate system. With this parallax map, the quadratic transformation parameters ($p_1, \ldots, p_8$) and the camera translation parameters ($T_{2x}, T_{2y}, T_{2z}$), are computed to register the second image with the third image. The second image is directly registered with the third image using the estimated parallax map as an initial input. Equation (4) is minimized to estimate the 11 pose parameters.

After the pose parameters between the second and the third image are estimated, the second image is then reprojected (by forward warping) to create a synthetic image taken from the third view-point. This synthetic image however contains image regions common to the first two images but not present in the third image. The final step to obtain the mosaic is to merge the synthetic third image with the actual third image.

To construct the parallax mosaic, the parallax map is forward warped to the third image coordinate system, much the same way as the second image was reprojected. Given the pose parameters between images 2 and 3, the parallax map of those portions not visible in 1, but visible in 2 and 3, can also be estimated. The reprojected parallax map is merged with this additional parallax information to complete the mosaic.

The alignment of all image frames in the sequence to form the mosaic can be performed in three ways:

Frame to frame: The alignment parameters are first computed between successive frames for the entire sequence. These parameters can then be composed to obtain the alignment parameters between any two frames of the sequence.

When constructing a static mosaic, the frames are aligned to a fixed coordinate system. If the mosaic coordinate system that is selected is that of a particular frame (called the "reference" frame), then other images are aligned to that frame. If a virtual coordinate system is selected, then the transformation between the virtual coordinate system and one of the input frames (the reference frame) is provided. In this case, this additional transformation is simply composed with the transformations used to align each frame to the reference frame.

Errors may accumulate during the repeated composition of alignment parameters. The alignment can be further refined by directly refining the transformation between each image frame and the mosaic image. To handle the problem of large displacements between the mosaic image and the new image frames, the alignment parameters computed between the previous frame and the mosaic image are used as an initial estimate.

In some dynamic applications such as real-time video transmission, the images are maintained in their input coordinate systems. In this case, the mosaic is aligned to the current frame. In this case the transformation between the most recent mosaic and the current frame is substantially identical to the transformation between the previous frame and the new frame.

Once the frames are aligned, or, in the dynamic case, the current mosaic and the new frame are aligned, they can be integrated to construct the mosaic image or to update the mosaic, in the dynamic case). Several schemes can be chosen for integrating the aligned images:

1. A regular temporal average of the intensity values of the aligned images.

2. A temporal median filtering of the intensity values of the aligned images.

Both a temporal average and a temporal median applied to a registered scene sequence produce a panoramic image of the dominant "background" scene, where moving objects either disappear or leave "ghost-like" traces. Temporal averages may result in blurrier mosaic images than those obtained by temporal medians.

3. A weighted temporal median or a weighted temporal average, where the weights decrease with the distance of a pixel from its frame center. This scheme aims at substantially ignoring alignment inaccuracies near image boundaries due to the use of low order 2D parametric transformations (especially when the field of view is wide).

4. A weighted temporal average where the weights correspond to the outlier rejection maps computed in the motion estimation process of the dominant "background". This scheme gives less "ghostlike" traces of "foreground" objects, and a more complete image of the dominant "background" scene as compared with the foreground.

5. A weighted temporal average where the weights correspond to the inverse outlier rejection maps computed in the motion estimation process of the dominant "background". The mosaic image constructed by applying such an integration method contains a panoramic image of the scene and of the event that took place in that scene sequence. This type of mosaic is called an "event mosaic" or a "synopsis mosaic", as it provides a "snapshot" view of the entire synopsis in the sequence. This kind of mosaic may be used for rapid browsing.

6. Integration in which the most recent information found in the most recent frame is used for updating the mosaic. This may be used in the dynamic mosaic construction. Of course, the update can be more gradual, e.g., a decaying temporal average which gives more weight to more recent information, and tends to forget information more distant in time.

In addition to forming the mosaic, at least one foreground portion or patch of the scene or sequence of images is enhanced. The foreground can also be a classification that includes one or more objects. The foreground portion or portions are enhanced by reviewing neighboring images in the image sequence to obtain further information about particular pixels in the object or foreground portion.

There are a number of approaches that can be employed to enhance an object or objects categorized as foreground portions. In one approach, image resolution is increased by obtaining multiple displaced images of the scene and combining the information from the multiple images into an enhanced image. The process of reconstructing a higher resolution image from several displaced images of the same scene often is referred to as "super resolution" enhancement. In these resolution enhancement techniques, the overall information content in the enhanced image can be greater than the information content in the individual original images.

In some super resolution methods, one of the lower resolution images in a sequence of lower resolution images is designated as a reference image. The coordinate frame of the reference image, which is the at least one foreground portion, is up-projected to the higher resolution level to define the coordinate frame of the higher resolution image. Motion vectors between pixels in the reference image (foreground portion) and pixels in images neighboring the reference image (foreground portion) in the multi-image sequence are estimated. The motion vectors then are up-projected to the coordinate frame of the higher resolution image. The up-projected motion vectors are used to remap the neighboring images (foreground portions) to the coordinate frame of the higher resolution image (foreground portion). Next, the coordinate frame of the higher resolution image is populated with pixel values that are computed based on some combinations of pixel values from the re-mapped lower resolution images.

One technique for enhancing image resolution includes computing a respective motion map for each pairing of a reference image and a respective image neighboring the reference image in a sequence of base images. Each motion map comprises a set of motion vectors mapping reference image pixels (associated with a foreground portion) to respective neighboring image pixels. Respective regions of a reference image are assigned to motion classes based on the computed motion maps. The target image has a target resolution level and the base images have a base resolution level equal to or lower than the target resolution level. Respective regions of a target image are assigned to motion classes based on up-projection from the reference image motion classes. Pixel values for the target image are computed based on corresponding pixel value contributions from the base images selected in accordance with the motion classes assigned to the target image regions.

The enhanced foreground portion or object is then merged into the mosaic background. In the case where super-resolution enhancement has been applied to the foreground portions, the background mosaic is up-sampled using any kind of interpolation technique to match the foreground resolution scale. There are several possibilities for output of the images. A single occurrence of an enhanced foreground portion or object can be placed at one spot into the mosaic formed from a sequence of individual images. In another possible output, multiple occurrences of an enhanced foreground portion can be placed into the mosaic formed to yield a still synopsis image. In yet another possible output, individual occurrences of an enhanced foreground portion can be placed into the mosaic formed in a succession to yield an image sequence of the enhanced foreground moving across the background mosaic. Each occurrence of an enhanced foreground image generally includes pixels or portions that can be tied to a position within the mosaic formed. Of course, errors can occur. The edges of the foreground portion can be smoothed or blended with the background portion to provide a high-quality output with the foreground portion or portions enhanced.

Hardware and Operating Environment

This section provides an overview of the example hardware and the operating environment in which embodiments of the invention can be practiced.

Figure 9:
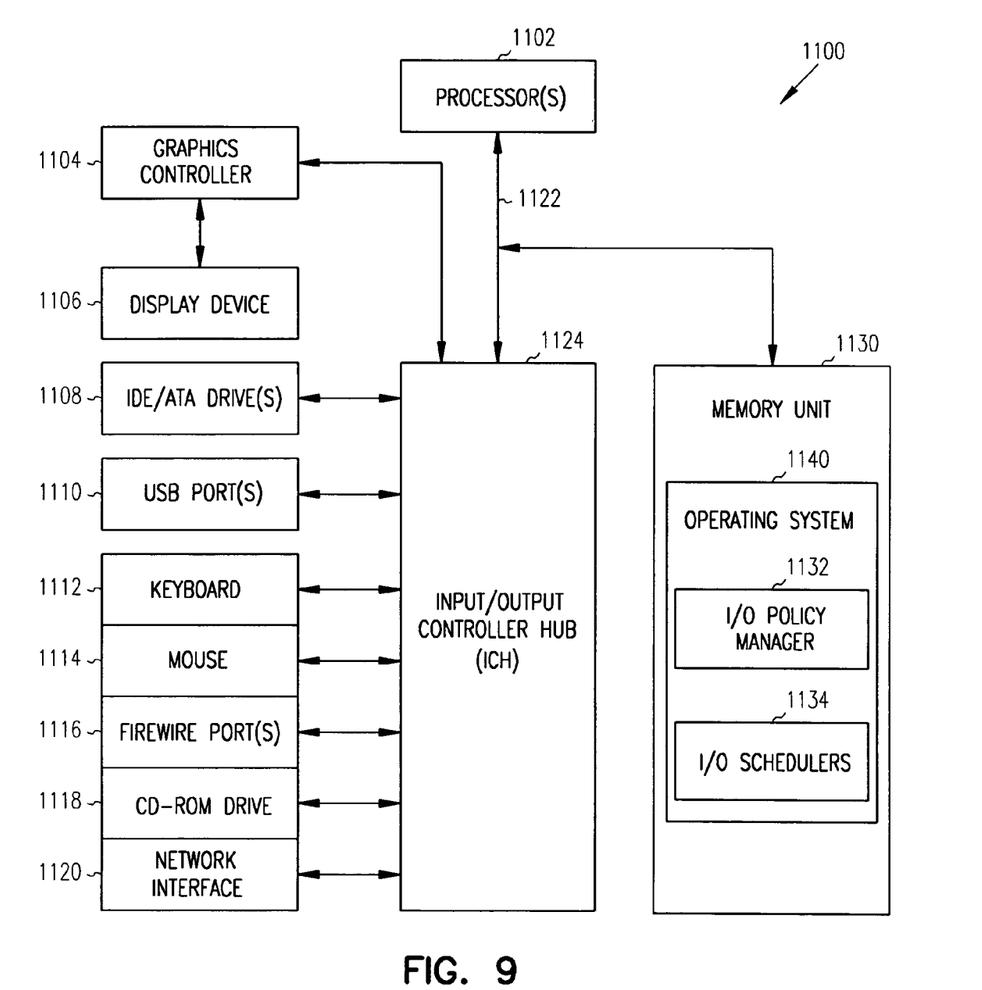
FIG. 9 illustrates an example computer system used in conjunction with certain example embodiments.

FIG. 9 illustrates an example computer system used in conjunction with certain embodiments of the invention. As illustrated in FIG. 10, computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes IDE drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. The ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

Thus, a system, method, and machine-readable medium including instructions for Input/Output scheduling have been described. Although the subject matter has been described herein with reference to specific example embodiments, it will be evident that various modifications and changes may be made to these embodiments without departing from the broader spirit and scope. Accordingly, the specification and drawings are to be regarded in an illustrative rather than a restrictive sense.

The invention claimed is:

1. A machine-implemented method of processing a sequence of input images of a scene, comprising:
    determining a respective set of motion vectors for each of one or more pairs of the input images;
    segmenting each of two or more of the input images into at least one respective background scene portion and at least one respective foreground scene portion based on respective ones of the motion vectors;
    stitching together ones of the respective background scene portions segmented from different ones of the input images to form background mosaic image data;
    enhancing at least one of the foreground scene portions segmented from the input images to form enhanced foreground scene image data, wherein the enhancing comprises increasing image resolution of the at least one foreground scene portion; and
    generating an output image, wherein the generating comprises combining the background mosaic image data and the enhanced foreground scene image data.

2. The method of claim 1, wherein the increasing comprises computing the enhanced foreground scene image data based on image value contributions from corresponding ones of the foreground scene portions segmented from respective ones of the input images.

3. A machine-implemented method of processing a sequence of input images of a scene, comprising:
    determining a respective set of motion vectors for each of one or more pairs of the input images;
    segmenting each of two or more of the input images into at least one respective background scene portion and at least one respective foreground scene portion based on respective ones of the motion vectors;
    stitching together ones of the respective background scene portions segmented from different ones of the input images to form background mosaic image data;
    enhancing at least one of the foreground scene portions segmented from the input images to form enhanced foreground scene image data, wherein the enhancing comprises determining image values corresponding to the at least one foreground scene portion at an increased image resolution level; and
    generating an output image, wherein the generating comprises combining the background mosaic image data and the enhanced foreground scene image data, wherein the combining comprises up-sampling the background mosaic image data to the increased image resolution level and merging the up-sampled background mosaic image data with the enhanced foreground scene image data.

4. The method of claim 3, wherein the combining comprises blending at least one edge in the enhanced foreground scene image data with the up-sampled background mosaic image data.

5. The method of claim 3, wherein the enhancing comprises enhancing multiple occurrences of at least one of the foreground scene portions to form the enhanced foreground scene image data, and the combining comprises placing each of the occurrences of the at least one enhanced foreground scene portion into the up-sampled background mosaic image data.

6. An apparatus for processing a sequence of input images of a scene, comprising:
- a motion estimation module that determines a respective set of motion vectors for each of one or more pairs of the input images;
- a scene segmentation module that segments each of two or more of the input images into at least one respective background scene portion and at least one respective foreground scene portion based on respective ones of the motion vectors received from the motion estimation module;
- a mosaic module coupled to the scene segmentation module and operable to stitch together ones of the respective background scene portions segmented from different ones of the input images to form background mosaic image data;
- an image enhancement module coupled to the scene segmentation module and operable to enhance at least one of the foreground scene portions segmented from the input images to form enhanced foreground scene image data, wherein the image enhancement module determines image values corresponding to the at least one foreground scene portion at an increased image resolution level; and
- a mosaic composition module coupled to the mosaic module and to the image enhancement module and operable to generate an output image, wherein in generating the output image the mosaic composition module combines the background mosaic image data and the enhanced foreground scene image data.

7. The apparatus of claim 6, wherein the mosaic composition module up-samples the background mosaic image data to the increased image resolution level and merges the up-sampled background mosaic image data with the enhanced foreground scene image data.

8. The apparatus of claim 7 wherein the image enhancement module enhances multiple occurrences of at least one of the foreground scene portions to form the enhanced foreground scene image data, and the mosaic composition module dynamically places each of the occurrences of the at least one enhanced foreground scene portions into the up-sampled background mosaic image data in succession to produce an image sequence of the at least one respective foreground scene portions moving across the background mosaic image.

9. A machine-readable medium that provides instructions that, when executed by a machine, cause the machine to perform operations comprising:
- determining a respective set of motion vectors for each of one or more pairs of the input images;
- segmenting each of two or more of the input images into at least one respective background scene portion and at least one respective foreground scene portion based on respective ones of the motion vectors;
- stitching together ones of the respective background scene portions segmented from different ones of the input images to form background mosaic image data;
- enhancing at least one of the foreground scene portions segmented from the input images to form enhanced foreground scene image data, wherein in performing the enhancing the instructions cause the machine to perform operations comprising determining image values corresponding to the at least one foreground scene portion at an increased image resolution level; and
- generating an output image, wherein the generating comprises combining the background mosaic image data and the enhanced foreground scene image data.

10. The machine-readable medium of claim 9, wherein in performing the combining the instructions cause the machine to perform operations comprising up-sampling the background mosaic image data to the increased image resolution level and merging the up-sampled background mosaic image data with the enhanced foreground scene image data.

* * * * *